United States Patent [19]

Rambold

[11] 4,230,981
[45] Oct. 28, 1980

[54] CURRENT SUPPLY INSTALLATION WITH VOLTAGE-CONTROLLED CURRENT SUPPLY DEVICES CONNECTED IN PARALLEL ON THE OUTPUT SIDE

[75] Inventor: Klaus Rambold, Krailling, Fed. Rep. of Germany

[73] Assignee: Siemens Aktiengesellschaft, Berlin & Munich, Fed. Rep. of Germany

[21] Appl. No.: 967,109

[22] Filed: Dec. 6, 1978

[30] Foreign Application Priority Data

Dec. 13, 1977 [DE] Fed. Rep. of Germany ....... 2755510

[51] Int. Cl.³ .......................... G05F 1/64; H02J 1/12
[52] U.S. Cl. ...................................... 323/25; 307/82; 363/65
[58] Field of Search ..................... 323/23, 25; 363/65, 363/69–72; 307/31–34, 64–66, 82

[56] References Cited

U.S. PATENT DOCUMENTS

| | | | |
|---|---|---|---|
| 3,226,630 | 12/1965 | Lampke | 323/66 |
| 3,515,974 | 6/1970 | Stich | 363/65 X |
| 3,636,433 | 1/1972 | Hyatt | 323/48 X |
| 3,808,452 | 4/1974 | Hutchinson | 307/64 |
| 3,815,014 | 6/1974 | Davis et al. | 307/33 X |
| 3,890,559 | 6/1975 | Kuster | 307/64 X |

Primary Examiner—J. D. Miller
Assistant Examiner—Peter S. Wong
Attorney, Agent, or Firm—Hill, Van Santen, Steadman, Chiara & Simpson

[57] ABSTRACT

A current supply installation is disclosed which comprises at least two voltage-controlled current supply devices connected in parallel at an output side without decoupling. In each of the current supply devices, a compound voltage value is formed by a first voltage proportional to a no-load voltage and a voltage proportional to an output voltage of the respective current supply device. This compound voltage value is used a the basis for an actul value for voltage control in each of the current supply devices.

8 Claims, 3 Drawing Figures

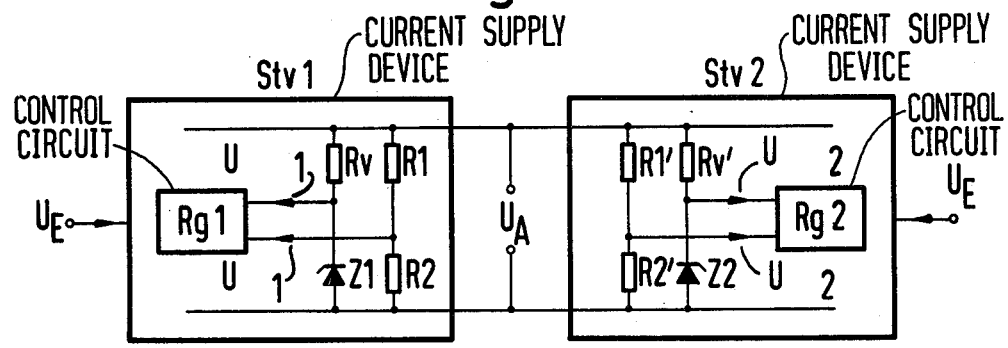
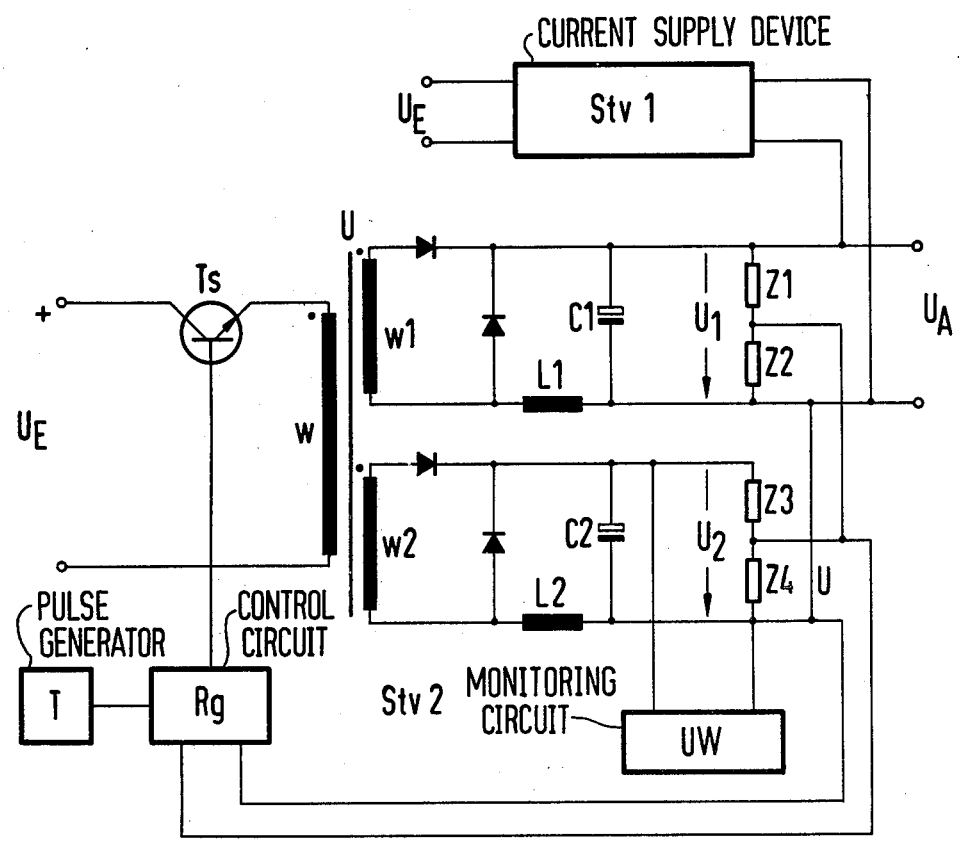

CURRENT SUPPLY INSTALLATION WITH VOLTAGE-CONTROLLED CURRENT SUPPLY DEVICES CONNECTED IN PARALLEL ON THE OUTPUT SIDE

BACKGROUND OF THE INVENTION

The invention relates to a current supply installation consisting of at least two voltage-controlled current supply devices connected in parallel without decoupling means on the output side.

Such a circuit arrangement is already known (U.S. Pat. No. 3,515,974).

This current supply installation relates to a plurality of DC blocking converters working to a common output, and whose power circuits consisting of a switching transistor, a transformer and a filter network are connected in parallel. A control voltage for the switching transistors is generated in dependence on the output voltage in an oscillator circuit common to all blocking converters. Connection techniques for uniform load division between the individual blocking converters are not provided, because, due to the intermediate storage of the energy to be transformed in the transformer, a rigid coupling between the individual switching transistors and the common output is lacking.

SUMMARY OF THE INVENTION

An object of the invention is, with minimum circuit complexity, to make possible a secure redundant operation of a plurality of current supply devices connected in parallel without decoupling means and to make possible operational monitoring, whereby, in addition to constant readiness for service, a nearly uniform load division is obtained.

In connecting current supply devices in parallel, slight differences of the rated output voltage are produced because of tolerances that are caused by the component parts. In voltage-controlled current supply devices, as a result of these differences in the output voltage, a totally unequal loading of the individual current supply devices arises, since only the current supply device with the highest output voltage can assume the entire load, whereas all other current supply devices, for which an actual value that is too high is simulated, are nearly disengaged. In this state, it cannot be determined by means of monitoring the output voltage whether a current supply device is carrying under-voltage because of a defect and which of the current supply devices, for example, is responsible for an over-voltage.

According to the invention, these disadvantages can be avoided with minimal circuit complexity in that a compound voltage value formed out of a voltage proportional to the no-load voltage and a voltage proportional to the output voltage of the current supply devices, is taken as the basis for each current supply device as the actual value of the voltage control. The voltage proportional to the no-load voltage is evaluated for monitoring purposes.

By means of these techniques, all current supply devices that are not conducting current are regulated to a voltage in the magnitude of the rated output voltage.

In accord with an advantageous embodiment of the invention, this solution can be realized circuit-wise in such manner that all current supply devices exhibit an auxiliary circuit separated from the main circuit with a similar frequency response as that of the main circuit, which is terminated with an actual value divider, and that a partial resistance or impedance of the actual value divider is connected in parallel with a partial resistance or impedance of a second actual value divider connected in the main circuit for the formation of the compound voltage value. This compound voltage can represent the average value of the two actual values.

The monitoring of the individual current supply devices can now ensue by means of a voltage monitoring circuit connected in each case to the output of the auxiliary circuit.

BRIEF DESCRIPTION OF THE DRAWINGS

In FIG. 1, the parallel connection of two voltage-controlled current supply devices is illustrated;

In FIG. 2, the arrangement of invention is shown with the example of a flow converter.

DESCRIPTION OF THE PREFERRED EMBODIMENT

Figure 3:
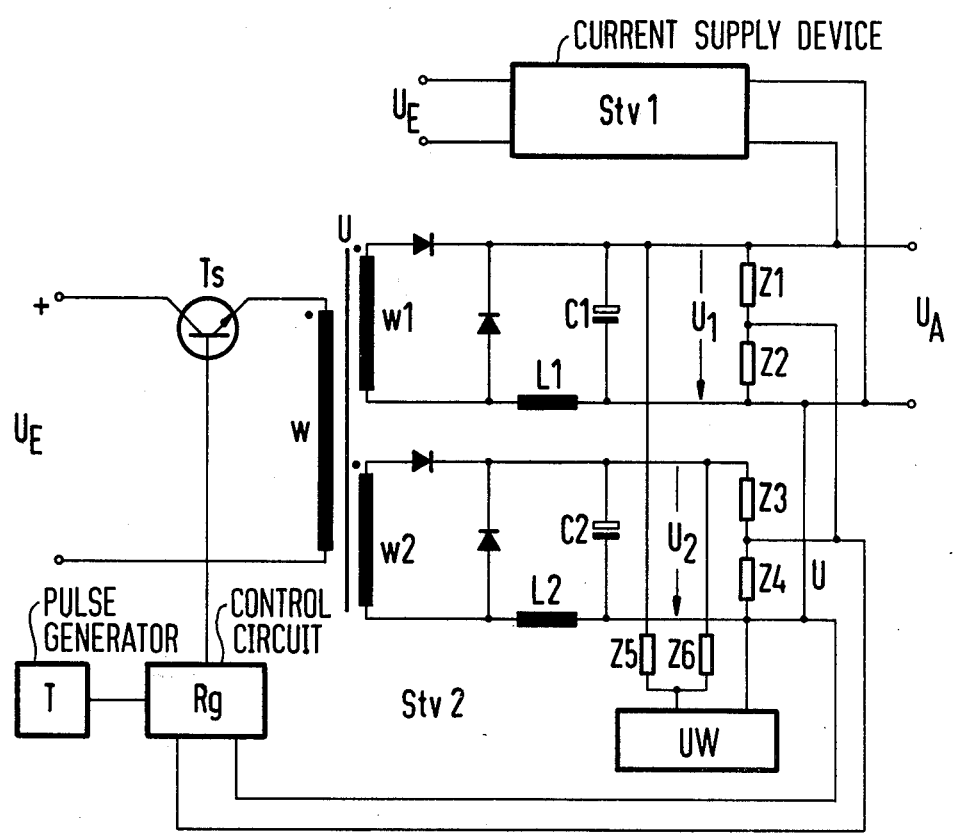
FIG. 3 shows a further sample embodiment of current supply devices connected in parallel.

Two voltage-controlled current supply devices Stv1 and Stv2 (FIG. 1) are connected in parallel on the output side without decoupling diodes and deliver an output voltage $U_A$. Both current supply devices are operated with a voltage $U_E$ which can be subject to fluctuations. Of the two current supply devices, only the output circuit with a part of the regulation loop is illustrated. Each respective actual value divider, consisting of the resistances R1, R2 and R1', R2', delivers the actual value $U_{Ist1}$ and $U_{Ist2}$ and each respective reference voltage circuit with the series resistance Rv and a Zener diode Z1 or Rv' and Z2, respectively, is connected with each respective control circuit Rg1 and Rg2 for the formation of a deviation signal. Although both current supply devices are designed alike and their output voltage $U_A$ is equally rated, slight differences in the output voltage induced by the component parts can exist, which lead to the fact that, in any given case, the device with the higher output voltage assumes the entire load, whereas the other current supply device carries a voltage at its output which is too high with reference to its nominal rated output voltage and therefore is regulated down to a very small voltage. In this state, neither a load division to the two current supply devices is possible nor can the current-carrying device be determined by monitoring the output voltage $U_A$ and the readiness for service of the current supply device not carrying current at that time be determined. This disadvantage could be partially eliminated in that the parallel connection of the two current supply devices ensues via decoupling diodes. Particularly in the case of low output voltages, however, the diodes would have the disadvantage that they would severely deteriorate the resulting efficiency of the current supply installation.

In the embodiment according to FIG. 2, the invention is shown with the example of two flow converters connected in parallel on the output side. Each of the two flow converters essentially consists of a transformer U whose primary winding w is periodically connected to an input voltage $U_E$ via a controlled switching transistor Ts. The output voltage $U_A$ is obtained at a secondary winding w1 via a diode and a LC-filter member L1, C1. The control of the switching transistor Ts ensues via a pulse generator T delivering a rectangular control voltage. The controlling AC voltage is influenced in its duty cycle as a function of the amplified deviation. Such a control circuit is described, for example, in U.S. Pat. No. 3,226,630 incorporated herein by reference. The output of the secondary circuit with the winding w1 exhibits an actual value divider Z1, Z2, which delivers a measuring value for a rated-value—actual-value comparison in a control circuit.

Beyond this main circuit, the flow converter exhibits an auxiliary circuit of similar construction which consists of a further secondary winding w2, a diode rectifier, and a LC-filter circuit L2, C2. The auxiliary circuit is terminated by means of an actual value divider Z3, Z4 and does not serve for power output. The divider elements Z1 through Z4 can, in general, be impedances which, for example, are formed out of parallel connections of resistors and capacitors. This, for example, can be necessary for the actual value filtering. The special design of this circuit consists in that one respective actual value proportional to the output voltage $U_1$ or $U_2$, respectively, is tapped for a mix from the actual value dividers of the main and auxiliary circuit. To this end, the resistors Z2 and Z4 of the actual value divider are connected in parallel. The interrelationships can be most simply illustrated in the average or mean value formation of the actual values. The prerequisite for the mean value formation is that equally large voltages are dropped across the resistors Z2 and Z4 in the no-load operation of the flow converter. This condition can be met most simply in that the main and auxiliary circuit are equally rated, i.e. that the secondary winding is designed such that w1=w2 and the resistors of the actual value divider are made Z1=Z3 and Z2=Z4. By means of a comparison of the mean actual value thus gained with a rated value, the deviation is developed which determines the duty cycle of the controlling AC voltage at the switching transistor Ts. When, for example, the current supply device Stv2 has a rated value which lies 2% below that of the current supply device Stv1, then the current supply device Stv1 regulates to the corresponding value $U_A$, whereas the current supply device Stv2 would like to force an output voltage that is 2% lower, i.e. would like to switch itself off. By means of the specific auxiliary circuit, however, the actual value of the current supply device Stv2 is brought up to the value of the rated value. The voltage $U_2$ on the auxiliary circuit would then lie about 4% below the voltage $U_A$ at the outputs of the current supply devices connected in parallel.

In a static load of the devices, the auxiliary voltage can be directly evaluated for monitoring purposes in a monitoring circuit UW. With a dynamic load, however, $U_2$ can fluctuate significantly. In order to also be able to work with narrow monitoring limits in this case, according to FIG. 3, a compound voltage of $U_A$ and $U_2$ is also formed for monitoring. This compound voltage is supplied to the monitoring circuit UW. The circuit required for this is different from the arrangement according to FIG. 2 in that by means of a voltage divider Z5, Z6 a monitoring voltage $U_3$ is formed from the difference of the output voltage $U_A$ and the auxiliary voltage $U_2$. Therefore, it must be observed that Z5/Z6=Z1/Z3 must be selected. In an operation free of interference, $U_3$ is always proportional to the voltage that the device in question would output in individual operation.

The specified basic circuit diagram is also applicable for parallel connection of more than two current supply devices as well as for all other controlled types of current supply devices, for example, continuously operating control devices.

The control circuit Rg employed in this invention is well known in the art and may be easily constructed by one skilled in this art. The same is true of the monitoring circuit UW.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A current supply installation comprising: at least two voltage-controlled current supply devices connected in parallel at an output side without decoupling means; each current supply device having voltage control means controlled by an actual voltage value; each current supply device having means for forming a compound voltage value from a first voltage proportional to its no-load voltage and a second voltage proportional to its output voltage; said compound voltage value forming a basis for the actual voltage value for the voltage control means; and means for evaluating the no-load voltage for monitoring purposes.

2. A current supply installation comprising: at least two voltage-controlled current supply devices connected in parallel at an output side without decoupling means; each current supply device having voltage control means controlled by an actual voltage value; each current supply device having means for forming a compound voltage value from a first voltage proportional to its no-load voltage and a second voltage proportional to its output voltage; said compound voltage value forming a basis for the actual voltage value for the voltage control means; means for evaluating the no-load voltage for monitoring purposes; each of the current supply devices having an auxiliary circuit separated from a main circuit with a frequency response that is similar to that of the main circuit; said auxiliary circuit being terminated with a first actual value voltage divider; a partial resistance of the first actual value voltage divider being connected in parallel with a partial resistance of a second actual value voltage divider connected to the main circuit for the formation of said compound voltage value.

3. A current supply installation according to claim 2, characterized in that a monitoring voltage is formed from a voltage difference between the output voltage and the no-load voltage, said monitoring voltage being produced by a voltage divider.

4. A current supply installation according to claim 2, characterized in that the main and auxiliary circuits as well as mutually corresponding partial resistances of the first and second actual value voltage dividers are formed of components having the same values.

5. A current supply installation according to claim 2, characterized in that the actual value voltage divider is constructed of impedances.

6. A current supply installation comprising:
   (a) at least two voltage-controlled current supply devices connected in parallel at an output side without decoupling means and where an output voltage is produced, each supply device having a voltage control circuit;
   (b) an auxiliary circuit means in each supply device for producing a substantially no-load voltage, and means connected to an output of the auxiliary circuit means for producing a second voltage proportional to the no-load voltage;

(c) means connected to the output side of each supply device for producing a first voltage proportional to the output voltage; and (d) means for combining the first voltage and the second voltage so as to produce a control voltage for the voltage control circuit.

7. The installation of claim 6 wherein a monitoring means is connected for monitoring the no-load voltage.

8. The installation of claim 7 wherein the monitoring means monitors both the no-load voltage and the output voltage.

* * * * *